(12) United States Patent
Houtz et al.

(10) Patent No.: US 6,468,145 B1
(45) Date of Patent: Oct. 22, 2002

(54) SYSTEM AND METHOD FOR CLEANING ANIMAL INTESTINES

(75) Inventors: Ronn A. Houtz, Derby, KS (US);
Matthew S. Osborn, Wichita, KS (US);
Chris G. Bandur, Omaha, NE (US);
Gene J. Beckermann, Omaha, NE (US)

(73) Assignee: Excel Corporation, Wichita, KS (US)

( * ) Notice: Subject to any disclaimer, the term of this patent is extended or adjusted under 35 U.S.C. 154(b) by 0 days.

(21) Appl. No.: 09/932,365

(22) Filed: Aug. 17, 2001

(51) Int. Cl.[7] .............................................. A22C 17/16
(52) U.S. Cl. ...................................... 452/123; 452/173
(58) Field of Search .................................. 452/123, 173

(56) References Cited

U.S. PATENT DOCUMENTS

| | | |
|---|---|---|
| 179,755 A | 7/1876 | Adamson |
| 482,600 A | 9/1892 | Trips |
| 964,066 A | 7/1910 | Sprenkle |
| 1,210,959 A | 1/1917 | Luer |
| 1,294,455 A | 2/1919 | Hardy |
| 1,302,194 A | 4/1919 | Mayer |
| 1,484,741 A | 2/1924 | Schonland, Jr. |
| 1,492,697 A | 5/1924 | Neuberth |
| 1,781,301 A | 11/1930 | Randall |
| 1,876,676 A | 9/1932 | Hill |
| 2,100,587 A | 11/1937 | Chalker |
| 2,119,311 A | 5/1938 | Biedermann |
| 2,526,449 A | 10/1950 | Arlow et al. |
| 2,697,245 A | 12/1954 | Clemens et al. |
| 2,701,386 A | 2/1955 | Strickler |
| 2,726,421 A | 12/1955 | Strickler |
| 2,795,817 A | 6/1957 | Dahlberg |
| 2,831,209 A | 4/1958 | Bergman et al. |
| 3,049,749 A | 8/1962 | Mayer et al. |
| 3,116,513 A | 1/1964 | Ine |
| 3,175,244 A | 3/1965 | Sharp et al. |
| 3,509,593 A | 5/1970 | De Moss |
| 4,293,980 A | 10/1981 | Ward |
| 5,820,453 A | 10/1998 | Burke |
| 6,083,096 A * | 7/2000 | Carrillo ....................... 452/123 |
| 6,315,654 B1 * | 11/2001 | Levsen ....................... 452/123 |

* cited by examiner

*Primary Examiner*—Peter M. Poon
*Assistant Examiner*—Joan M. Olszewski
(74) *Attorney, Agent, or Firm*—Dorsey & Whitney LLP (57) ABSTRACT

The present invention is a system and method for cleaning the interior and exterior surfaces of an animal intestine. The system includes a carrier for holding and transporting sections of the intestine along a closed-path track. A vertically disposed tube, located at a point along the track, is connected to a cleaning fluid supply and directs a spray of cleaning fluid at the exterior surfaces. A cleaning nozzle, located at a point along the track, directs cleaning fluid into an interior of the intestine.

7 Claims, 5 Drawing Sheets

SYSTEM AND METHOD FOR CLEANING ANIMAL INTESTINES

CROSS-REFERENCE TO RELATED APPLICATION(S)

None.

BACKGROUND OF THE INVENTION

The present invention relates to a system and method for cleaning animal intestines. More particularly, it relates to a system for cleaning both the interior surface and the exterior surface of an extracted animal intestine using a washing action provided by a cleaning fluid.

In the slaughter of mammalian or red-meat animals, the primary meat and meat products are derived from the animal's skeletal muscles (i.e., those muscles that are attached to the skeleton and function to facilitate movement and support the weight of the animal). A number of other parts of the carcass are either consumed directly by people or used in the production of other foods. These portions of the carcass are often referred to as "offal." Various types of red-meat slaughter animals include beef or bovine (e.g., cattle, steers, heifers, cows, bulls, and buffalo), pork or porcine (e.g., sows, gilts, barrows, boars, and pigs), and ovine (e.g., sheep and lamb). Typical beef offal includes the stomach, heart, brains, tongue, liver, kidneys, intestines, and mesentery (the folds of the peritoneum that connect the intestines to the dorsal abdominal wall). Typical pork offal includes the liver, kidney, brains, head, and intestines. Also, the wall of the intestine, with the inner lining (commonly referred to as the "mucosa") removed, is used for packaging of sausages.

The present invention is directed to a system for cleaning the intestines, including both the small and large intestines, of these various red-meat slaughter animals, so that the intestines are suitable for human consumption. The intestine is a generally soft, tubular element, which extends from the stomach to the anus. The small intestines of various red-meat animals vary in length from about 15 feet to about 120 feet. The small intestines of cattle, for example, typically extend 80 feet to 120 feet, more typically from 100 feet to 110 feet, while the small intestines of hogs typically extend 15 feet to 18 feet. These animal intestines are generally extracted from the carcass of the dead animal during the slaughtering process. When extracted, the intestines generally remain attached to the mesentery and are disposed in a sinuous configuration. The intestines typically have connective tissue, fat tissue, and glands attached to an exterior surface, which must be removed prior to human consumption.

In a live red-meat animal, the intestines receive food (also referred to as "ingesta") from the stomach, which is passed along the length of the intestine so that nutritional components of the food can be absorbed into the animal's blood stream. The unabsorbed portion of the food is discharged from a distal end of the intestine as digesta or fecal matter. Intestines which are harvested from the carcasses of red-meat animals during slaughtering contain some amount of digesta or fecal matter, which must be removed prior to human consumption.

One common food product made from animal intestines is "chitterlings," which are made from hog intestines. Many devices for cleaning chitterlings are known in the prior art, including those disclosed in U.S. Pat. No. 3,509,593 to DeMoss and U.S. Pat. No. 5,820,453 to Burke. These devices operate by passing the chitterling over a tubular element having a nozzle for spraying water onto the interior surface to remove a portion of the fecal matter. In commercial cleaning operations, the chitterlings are then commonly slit longitudinally and cleaned further using a centrifugal or agitating washing action. Finally, the chitterlings are then commonly passed through a hand-cleaning and inspection station for further cleaning.

In Hispanic cultures, "tripas" are prepared from the small intestines of slaughtered red-meat animals. In European and Hispanic cultures intestines are used for sausage skin or casing. In both of these applications, the intestines must be properly cleaned such that they are suitable for human consumption. A device for washing tripas is disclosed in U.S. Pat. No. 6,083,096 to Carrillo.

The prior art systems and methods for cleaning animal intestines are labor-intensive and require much human intervention. This slows the cleaning process to below commercial chain speeds in a meat processing facility.

There is a need in the art for a system and method of removing ingesta and other undesirable particles from the surfaces of an animal intestines at commercial chain speeds (300 head per hour or more). There is a further need in the art for a device capable of cleaning the animal intestines without causing structural damage to the intestine, including the inner lining or mucosa of the intestine.

BRIEF SUMMARY OF THE INVENTION

The present invention, in one embodiment, is a device for cleaning an inner surface and an outer surface of a section of an animal intestine. In this embodiment, the device includes a carrier for supporting at least one of the sections and providing a connection to the inner surface. The device further includes a track for guiding and supporting the carrier, the track configured in a closed-loop. The device includes at least one vertically disposed tube having a plurality of orifices for directing a fluid at the outer surface. At least one nozzle is located along the elevated portion of the track and is adapted to direct the fluid into the connection of the carrier.

The present invention, in another embodiment, is a method of cleaning an interior surface and an exterior surface of animal intestines. In this embodiment, the method includes attaching the animal intestines to a carrier adapted to guide the animal intestines along a track and to allow access to the interior surface. The method includes elevating the carrier until the animal intestines hang vertically above ground level and impinging a spray of cleaning fluid onto the exterior surface of the plurality of animal intestines. The method also includes introducing a flow of cleaning fluid into the interior surface of the plurality of animal intestines through the carrier.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
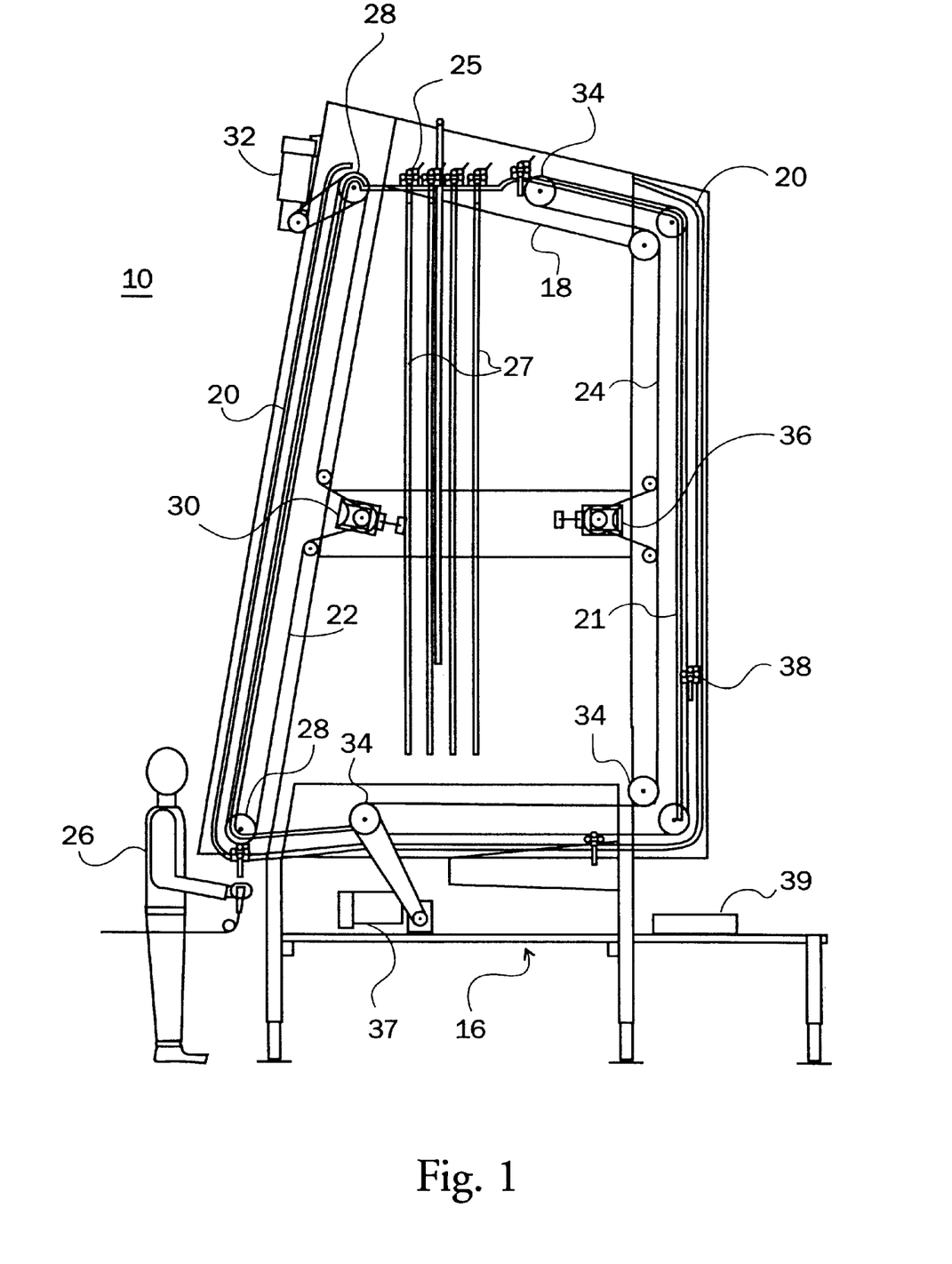
FIG. 1 is a side view of an intestine washing system according to one embodiment of the present invention.

FIG. 1 shows a side view of an intestine washing system 10 according to one embodiment of the present invention. As shown in FIG. 1, the system 10 includes a base 16, a frame assembly 18, an outer track 20, an inner track 21, a lift drive chain 22, a return drive chain 24, and a carrier 25. As shown in FIG. 1, the base 16 is connected to and supports the frame assembly 18 above ground level. In one embodiment, the base 16 supports the frame assembly 18 at a level of 3 to 4 feet off the ground for the convenience of an operator 26, who must connect intestine sections or product 27 to the trolley or carrier 25. The frame assembly 18, in one embodiment, is constructed from steel, although structural members of any type can be used.

The frame assembly 18 supports the outer track 20 and the inner track 21, which together define a closed travel path of the carrier 25. In one embodiment, the outer track 20 and the inner track 21 are constructed from metal rods, such as steel. The outer track 20 and the inner track 21 are generally coplanar and maintain a constant spacing or separation adapted to support the carrier 25, as further discussed below.

The lift drive chain 22 is attached to the frame assembly 18 by a set of sprockets or drive plates 28. The tension in the lift drive chain 22 is adjustable by the tension assembly 30, and the lift drive train 22 is driven by an electric lift motor 32. In the embodiment illustrated in FIG. 1, the electric lift motor 32 is mounted to the frame assembly 18. The return drive chain 24 is also connected to the frame assembly 18 through sprockets or drive plates 34. The tension in the return drive chain 24 is adjustable by the tension assembly 36, and the return drive chain 24 is driven by an electric return motor 37. In the embodiment illustrated in FIG. 1, the electric return motor 37 is mounted to the base 16 of the intestine cleaning system 10.

A release mechanism 38 is located along the return drive chain 24, as shown on the right-hand side of FIG. 1. The release mechanism 38 operates to release product 27, after it has been cleaned. The lift drive chain 22 and the return drive chain 24 function to drive the carrier 25 along the travel path defined by the outer track 20 and the inner track 21. A container 39, supported by the base 16, is located near a vertically descending portion of the tracks 20, 21 (shown near the right-hand side of FIG. 1) for collection of the product after it has been cleaned.

Figure 2A:
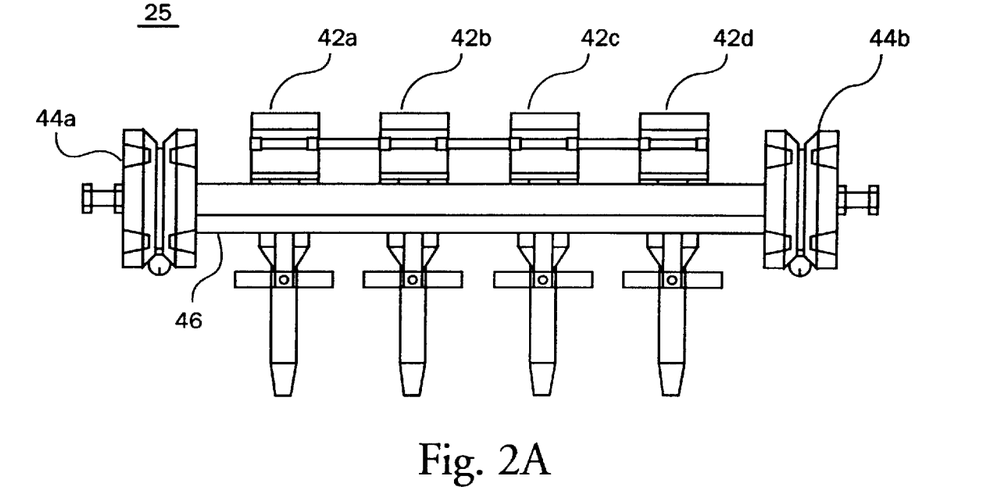
FIG. 2A is a sectional view of a nozzle assembly of the carrier of FIG. 2B, according to one embodiment of the present invention

FIG. 2A is a front view of the carrier 25, according to one embodiment of the present invention. As shown in FIG. 2A, the carrier 25 includes a set of nozzle assemblies 42a, 42b, 42c, 42d. While the embodiment shown in FIG. 2A includes four nozzle assemblies 42, other embodiments may include any number of such nozzle assemblies, including fewer nozzle assemblies 42 and more nozzle assemblies 42. As further shown in FIG. 2A, the carrier 25 includes wheels 44a, 44b and a carrier body 46. The nozzle assemblies 42 are connected to and pass through the carrier body 46. The carrier body 46 is rotatably coupled to the wheels 44a and 44b, such that the nozzle assemblies 42 remain oriented perpendicular to the ground, while the carrier 25 traverses the tracks 20, 21. In other words, the body 46 of the carrier 25 is free to pivot with respect to the wheels 44a and 44b of the carrier 25. In the embodiment shown in FIG. 2A, the wheels 44a and 44b include generally central V-shaped grooves adapted to mate with the rods of the outer track 20 and the inner track 21. In one embodiment, the wheels 44a, 44b are polymer wheels, as known in the art, which do not require lubrication.

Figure 2B:
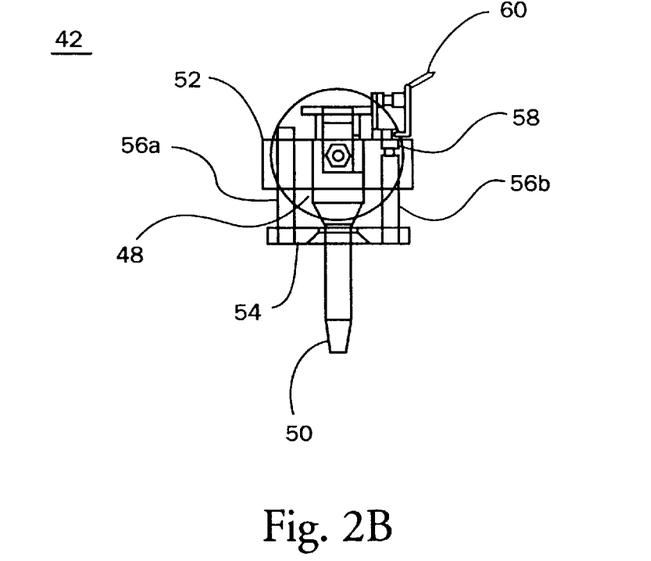
FIG. 2B is a front view of a carrier, for use with the intestine washing system, according to one embodiment of the present invention.

FIG. 2B is a sectional view of one of the nozzle assemblies 42. As shown in FIG. 2B, the nozzle assembly 42 includes a cylindrical nozzle 48, having a tapered distal tip 50. The cylindrical nozzle 48 is mounted to and passes through a body 52. The nozzle assembly 42 further includes an annular ring 54 coupled to the body 52 by support cylinders 56a and 56b. Cylinder 56b includes a notch 58 for receiving a latch 60. The support cylinders 56a, 56b are spring-loaded such that they are biased in a downward direction (toward the tapered distal tip 50). As illustrated in FIG. 2B, the annular ring 54 includes a tapered aperture through its center. The aperture is tapered such that it is wider on a face closer to the tapered distal tip, and narrower on a face closer to the body 52. This taper feature facilitates passage of the product 27 through the aperture, which can then be locked in place, as further described below.

Figure 3:
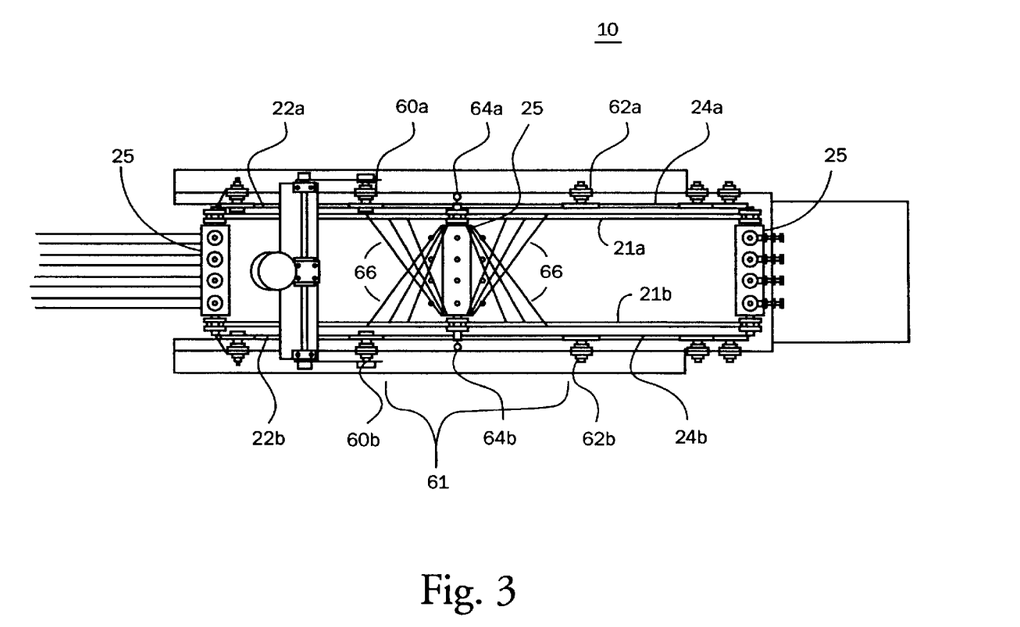
FIG. 3 is a top view of a top section of the intestine washing system, shown in FIG. 1, according to one embodiment of the present invention.

FIG. 3 shows a top view of a top portion of the intestine washing system 10 according to one embodiment of the present invention. As shown in FIG. 3, the system 10 generally includes two sets of components disposed in generally parallel planes for supporting and driving the carrier 25. In the top portion of the system 10, the support and guiding of the carrier 25 is performed by the inner track 21 (further illustrated near the top of FIG. 1).

As shown on the left-hand side of FIG. 3, the lift drive chain 22 includes a rear lift drive chain 22a and a front lift drive chain 22b for driving a first end and a second end of the carrier 25. The lift drive chains 22a, 22b are disposed in generally parallel planes. In another embodiment of the present invention, only one lift drive chain 22 is employed. The lift drive chains 22a, 22b terminate at the corresponding sprockets or drive plates 60a and 60b. As also shown in FIG. 3, the inner track 21 includes a rear inner track 21a and a front inner track 21b for supporting the first wheel 44a and the second wheel 44b of the carrier 25 as it travels along the top portion of the intestine washing system 10. As shown near the center of FIG. 3, the top portion includes a free trolley section 61 where the carrier is supported and guided by the inner tracks 21a, 21b, but is not driven. As shown near the right-hand side of FIG. 3, the top portion includes a portion of the return drive chain 24, which includes a rear return drive chain 24a and front return drive chain 24b disposed in generally parallel planes. The return drive chain 24 originates at drive plates 62a and 62b. The free trolley section 61 extends from the drive plates 60a, 60b to the drive plates 62a, 62b.

FIG. 3 also shows a top view of fluid supply pipes 64a and 64b. The fluid supply pipes 64a, 64b extend generally downward from the inner tracks 21a, 2ab in a direction substantially perpendicular to the plane of travel of the carrier 25. The fluid supply pipes 64a, 64b include a plurality of generally equally spaced nozzles along their length. The nozzles are configures to generate the spray pattern 66 shown in FIG. 3, which acts to clean an exterior surface of product, as explained in greater detail below. In one embodiment of the present invention, the fluid supply pipes 64a, 64b supply water to perform cleaning of the outer surface of the product 27. In other embodiments, other cleaning fluids known to those of skill in the art are used to perform the cleaning operation.

During operation of the intestine washing system 10 (shown in FIG. 1), the operator 26 takes a section of product 27 and slides it over the tapered distal tip 50 of the nozzle 48, through the tapered aperture of the ring (shown in FIG. 2). The tapered aperture is wider at a proximal face (closer to the tapered distal tip 50) and narrows as it moves toward a distal face. This taper facilitates insertion of the product 27. Once the product 27 is inserted through the aperture, the operator 26 pushes up the annular ring 54, along the support cylinders 56a, 56b, until the latch 60 engages the notch 58, thereby securing the annular ring 54 in place. At this point, the product 27 is secured in place between the annular ring 54 and the tapered aperture of the nozzle 48. The operator then repeats this process for each of the nozzles 42a, 42b, 42c, 42d, such that four sections of product 27 are connected to the carrier 25.

Once all sections of product are attached to the carrier 25, the operator 26 moves the carrier 25 forward along the tracks 20, 21 until it engages the lift drive chain 22. The lift drive chain 22 then raises the sections of product 27 to the top of the intestine cleaning system 10 (the area shown in FIG. 3), where the carrier 25 is released from the lift drive chain 22 onto a proximal end of the free trolley section 61.

In one embodiment of the present invention, the product 27 is pre-cut prior to introduction to the intestine washing system 10, using one of the techniques known in the art. In another embodiment of the present invention, the product 27 is not pre-cut, but instead cutting is performed by the intestine cleaning machine, when the carrier 25 reaches an appropriate height.

The carrier 25 will remain in a position adjacent to the distal end of the lift drive chain 22 until a second carrier 25 reaches the top of the intestine cleaning system 10 and indexes the carrier 25 one position forward (toward the right, as shown in FIG. 1). Each successive carrier 25 reaching the top portion entering the free trolley section 61 will index the prior carriers 25 further down the tracks 21a, 21b of the free trolley section 61.

While positioned at the top of the intestine cleaning system 10, as shown in FIG. 3, the carrier 25 is supported by the inner tracks 21a, 21b, and it spans the distance between the tracks such that the sections of the intestine hang down generally perpendicular to the tracks 21a, 21b. As the carrier 25 moves along the free trolley section 61, its exterior surface is cleaned by a spray of cleaning fluid 66, from the fluid supply pipes 64a, 64b, impinging on the exterior surface. The spray of fluid, according to one embodiment of the present invention, is shown in FIG. 3. As the carrier 25 progresses along the free trolley section 61, the fluid spray 66 impinges upon different portions of the exterior surface of the product 27 so that, by the time the carrier 25 has completely traversed the free trolley section 61, the exterior surface will be free of fecal matter and other contaminants. In one embodiment of the present invention, the fluid supply pipes 64a, 64b carry water charged to a pressure of about 60 to about 80 psi. In one embodiment, the fluid supply pipes 64a, 64b include nozzles adapted to spray fluid in a fan at angles of about 15 to about 60 degrees from a line extending between the pipes, as shown in FIG. 3. In one embodiment the intestine cleaning system 10 includes controls to regulate the pressure of the fluid in the fluid supply pipes 64a, 64b.

At one point along the free trolley section 61, the nozzle assemblies 42a, 42b, 42c, 42d of the carrier 25 align with corresponding fluid supply nozzles located above the tracks 21a, 21b along the free trolley section 61. At this point, the cleaning fluid is introduced into the interior of the sections of product 27 through the nozzles 48 in the nozzle assemblies 42a, 42b, 42c, 42d by injecting the fluid into the orifices located at the tops of the nozzles 48. The cleaning fluid is then driven by gravitational forces through an interior lumen of the sections of product 27 and will discharge out a distal end of the sections into a collection trough below, where it can be disposed of properly. This cleaning fluid will scrub interior walls of the sections of intestine and remove any digesta and fecal matter therein. This waste material will travel with the cleaning fluid into the collection trough below for disposal. In one embodiment of the present invention, the fluid supply nozzles supply a free flow of water for about 8 to about 16 seconds. In another embodiment, water is allowed to flow through the interior lumen of the product 27 until the water is exiting the product 27 appears clear.

Once the carrier 25 reaches the distal end of the free trolley section 61, it is engaged by the return drive chains 24a, 24b, and is guided by the outer track 20 and the inner track 21 in a generally downward direction. As the carrier 25 travels downward, the product 27 enters the container 39, so that it can be removed for further processing or packaged. When the carrier 25 reaches the release mechanism 38, the release mechanism 38 contacts and manipulates the latch 60, which releases the support cylinders 56a, 56b. This, in turn, releases the rings 54 of the nozzle assemblies 42a, 42b, 42c, 42d. The rings 54 are then driven downward by the spring action, thereby releasing the sections of product 27. In one embodiment, this release point is located about 3 feet above the container 39.

In one embodiment, the container 39 is a stationary container or tray that accepts the clean product 27. In another embodiment, the container 39 is mounted on an oscillating driver so that the product 27 is placed into the container 39 in a serpentine fashion. This places the product 27 in a configuration suitable for directly packaging for sale to the consumer.

When the carrier 25 reaches a bottom of the outer track 20, the outer track 20 guides the carrier 25 along a lower section of the intestine cleaning system 10 back toward the operator 26. In one embodiment, the lower section of the system 10 includes a carrier cleaning system for removing any contamination from the carrier 25. In one embodiment, the carrier cleaning system is comprised of one or more nozzles for spraying a cleaning fluid onto the carrier as it travels along the bottom section. In one embodiment, the cleaning fluid is the same cleaning fluid used to clean the product 27. In another embodiment, a more powerful cleaning fluid (such as a bleach) is used, followed by a water rinse of the carrier 25.

Once the carrier 25 reaches the end of the release drive chain 24, carrier 25 is released onto a free load section, where it awaits loading by the operator 26. At this point, the carrier 25 has completed a full loop through the intestine cleaning system 10, has been cleaned of contaminants, and is ready to complete a second cycle.

The system 10 of the present invention, in one embodiment, operates at a rate sufficient to clean sections of small intestines at typical commercial chain speeds of a meat processing facility. In one embodiment, the system 10 can keep pace with a meat processing line operating at about 300 head per hour. In one embodiment, two or more of the systems 10 are operated in parallel to provide each operator 26 with additional time to attach sections of product 27 to the carrier 25.

Figure 4:
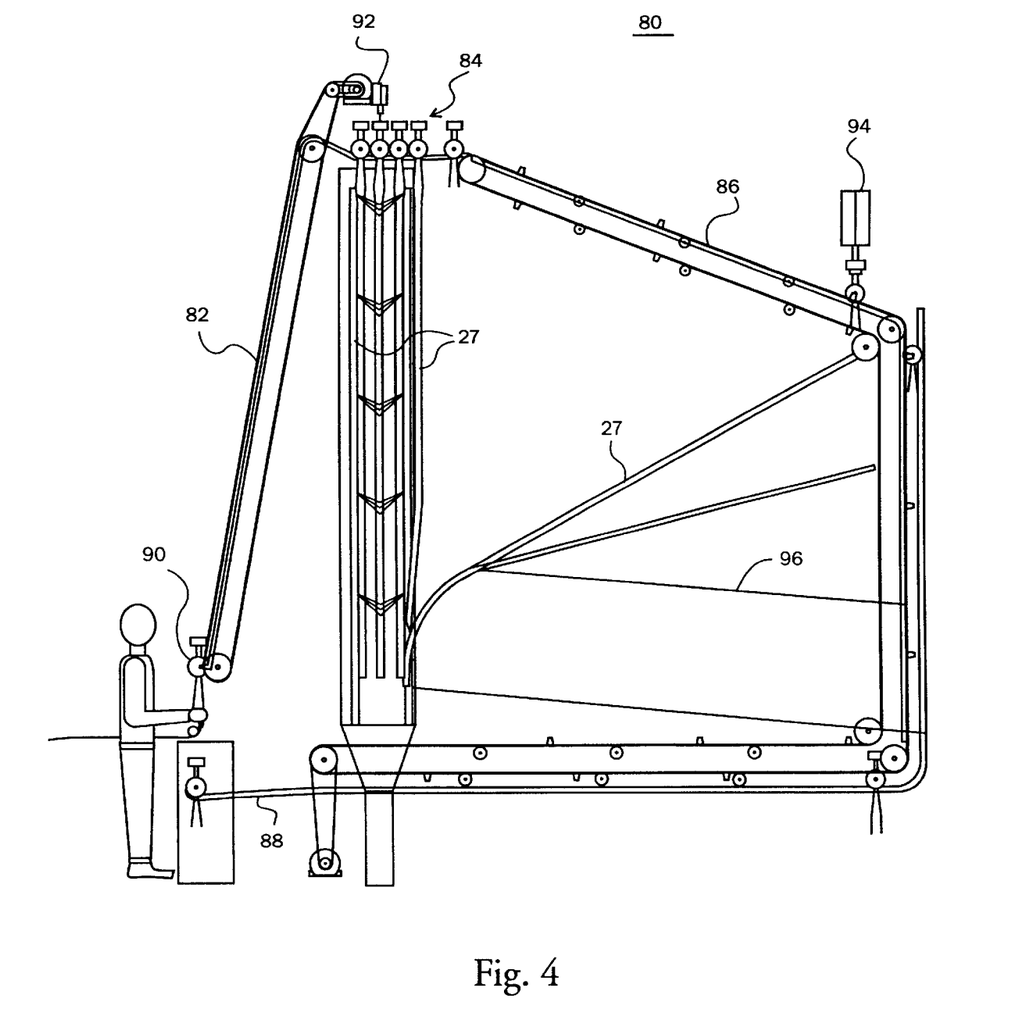
FIG. 4 is a side view of an intestine washing system according to a second embodiment of the present invention.

FIG. 4 is a side view of an intestine cleaning system 80 according to a second embodiment of the present invention. As shown in FIG. 4, the intestine cleaning system 80 includes lift drive chain section 82, a free trolley section 84, a return drive chain section 86, and a carrier accumulator 88. The intestine cleaning system 80 further includes a carrier 90, a fluid injector 92, and a carrier release 94. Each of the sections 82, 84, and 86 are connected to a pair of continuous tracks that support wheels of the carrier. The intestine cleaning system 80 shown in FIG. 4 differs from the intestine cleaning system 10 shown in FIG. 1 in three main aspects. First, the intestine cleaning system 80 is designed for operation with a carrier adapted to carry only one intestine section (shown in FIG. 5). Second, the system 80 includes a collection tray 96 for gently laying down the intestine sections after cleaning. Third, the system 80 includes four fluid-cleaning tubes and corresponding sets of fluid spray nozzles, as shown in FIG. 5.

Figure 5:
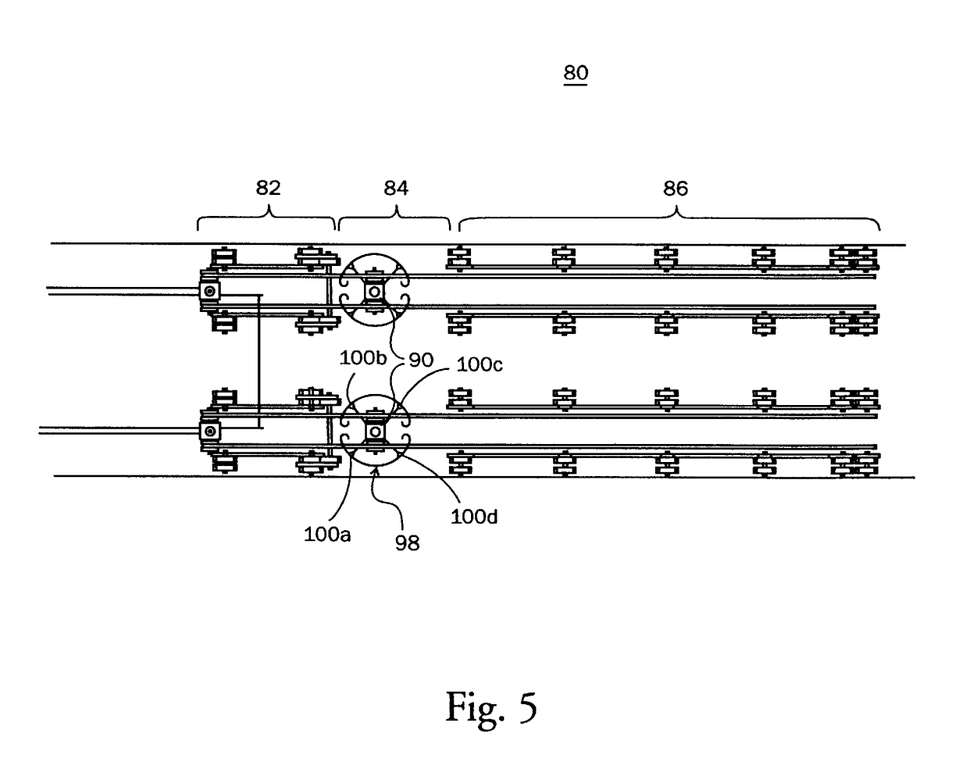
FIG. 5 is a top view of a top section of the intestine washing system, shown in FIG. 4, according to one embodiment of the present invention.

FIG. 5 shows a top view of the intestine-cleaning system 80, according to one embodiments of the present invention. The embodiment shown in FIG. 5 includes two parallel sets of tracks for guiding two carriers 90 in parallel. In other embodiments of the present invention, more tracks may be set up in parallel to carry more of the carriers 90. FIG. 5 also shows an exterior cleaning system 98 according to one embodiment of the present invention. As shown in FIG. 5, the exterior cleaning system 98 includes four water supply pipes 100a, 100b, 100c, 100d. Each of the water supply pipes 100a, 100b, 100c, 100d includes a plurality of spray nozzles located along its length and directed towards a center point of the cleaning system 98.

During operation of the intestine cleaning system 80, the operator selects a length of intestine and attaches it to the carrier 90. The carrier 90 includes expandable jaws which engage an interior of the intestine and are released to expand and secure the section of intestine to the carrier 90. The operator than places the carrier 90 onto the lift drive chain 82, the carrier 90 moves onto the free trolley section 84. The carrier 90 is moved along the free trolley section 84 when the next carrier 90 reaches the top of the lift drive chain.

As the carrier 90 moves from a proximal end to a distal end of the free trolley section 84, the carrier 90 passes through the cleaning system 98, as shown in FIG. 5. As the carrier 90 moves through the cleaning system 98, it is sprayed with cleaning fluid from the fluid supply pies 100a, 100b, 100c, 100d. Also, when the carrier 90 reaches the position along the free trolley section 84 where the nozzle injector 92 is located, water is introduced into an interior of the intestine section through an orifice in the carrier 90. cleaning fluid is allowed to pass through the interior surface of the intestine section until substantially all digesta and fecal matter is removed from the interior of the intestine. When the carrier 90 reaches a distal end of the free trolley section 84, it engages the return drive chain 86, and it begins a gradual descent.

As the carrier 90 descends along the return drive chain 86, the intestine section is laid down on the tray 96. When the carrier 90 reaches the release mechanism 94, the intestine section is released from the carrier 90 and falls onto the tray 96. As shown in FIG. 4, the initial segment of the return drive chain 86 has a relatively shallow slope and the tray 96 is rounded at a proximal end, such that the intestine section is laid down gently in a substantially extended configuration. The carrier 90 then travels along to the distal end of the return drive chain 86, where it is cleaned for further use, and is placed on the carrier accumulator 88, where it becomes available to the operator. Next, the intestine sections located on the collection trough 96 may be subjected to further processing or removed to a packaging area to be packaged.

In one embodiment of the present invention, the intestine-cleaning system 10 includes a release switch. In this embodiment, the operator causes the lift drive chain 22 to engage the carrier 25 by pressing the release button. In one embodiment, the release switch is placed near the operator's knee and is adapted to be activated by the operator's knee. This design allows the operator 26 to have control over when the carrier 25 engages the lift drive chain 22.

Both of the intestine cleaning systems 10, 80 disclosed are capable of cleaning intestine sections at a sufficient rate to keep pace with a typical meat processing assembly line operating at about 300 head per hour. The specific rate of the systems 10, 80 will depend on the number of sections cleaned at one time and the rates at which the operator is able to properly mount intestine sections to the carrier.

Although the present invention has been described with reference to preferred embodiments, persons skilled in the art will recognize that changes may be made in form and detail without departing from the spirit and scope of the invention.

We claim:

1. A method of cleaning an interior surface and an exterior surface of a plurality of animal intestines, the method comprising:
   attaching the plurality of animal intestines to a carrier, the carrier adapted to guide the animal intestines along a track and to allow access to the interior surface;
   elevating the carrier until the plurality of animal intestines hang vertically above ground level;
   impinging a spray of cleaning fluid onto the exterior surface of the plurality of animal intestines; and
   introducing a flow of cleaning fluid into the interior surface of the plurality of animal intestines through the carrier.

2. The method of claim 1 further including lowering the plurality of animal intestines onto a table.

3. The method of claim 1 further including lowering the plurality of animal intestine into a container.

4. The method of claim 3 further including releasing the plurality of animal intestines near the conclusion of the lowering step.

5. The method of claim 3 further including applying a sinusoidal driving force to the container during the lowering step, such that the plurality of animal intestines enter the container in a serpentine configuration.

6. The method of claim 2 further comprising returning the carrier to an attachment point for access by an operator.

7. The method of claim 6 wherein returning the carrier includes sanitizing the carrier prior to reaching the attachment point.

\* \* \* \* \*

UNITED STATES PATENT AND TRADEMARK OFFICE
CERTIFICATE OF CORRECTION

PATENT NO. : 6,468,145 B1 Page 1 of 1
DATED : October 22, 2002
INVENTOR(S) : Ronn A. Houtz et al.

It is certified that error appears in the above-identified patent and that said Letters Patent is hereby corrected as shown below:

Column 7,
Line 45, please delete "82, the carrier 90 moves onto the free trolley section 84. The" and insert -- 82 and repeats this process of the carrier 90 on the parallel system. The carrier 90, along with the intestine section, is transported to a top of the intestine cleaning system 80. When the carrier 90 reaches a distal ed of the lift drive chain 82, the carrier 90 moves onto the free trolley section 84. The -- therefor.

Signed and Sealed this

Eighteenth Day of March, 2003

JAMES E. ROGAN
*Director of the United States Patent and Trademark Office*